UNITED STATES PATENT OFFICE.

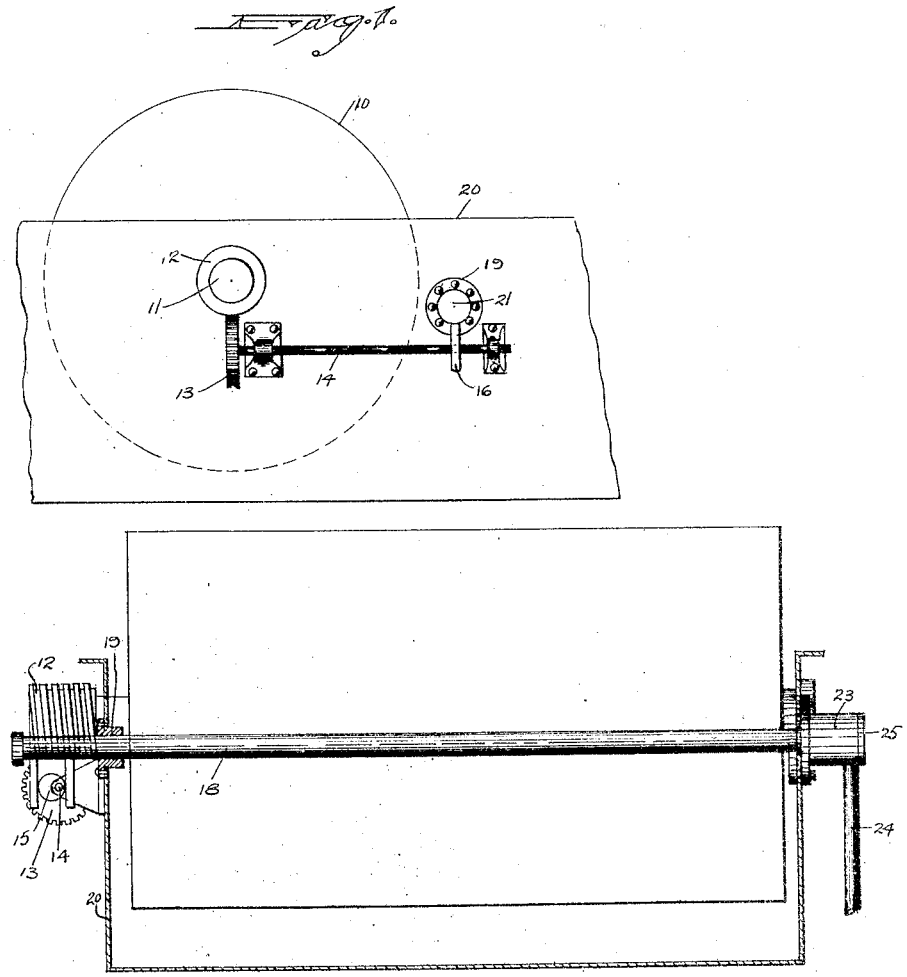

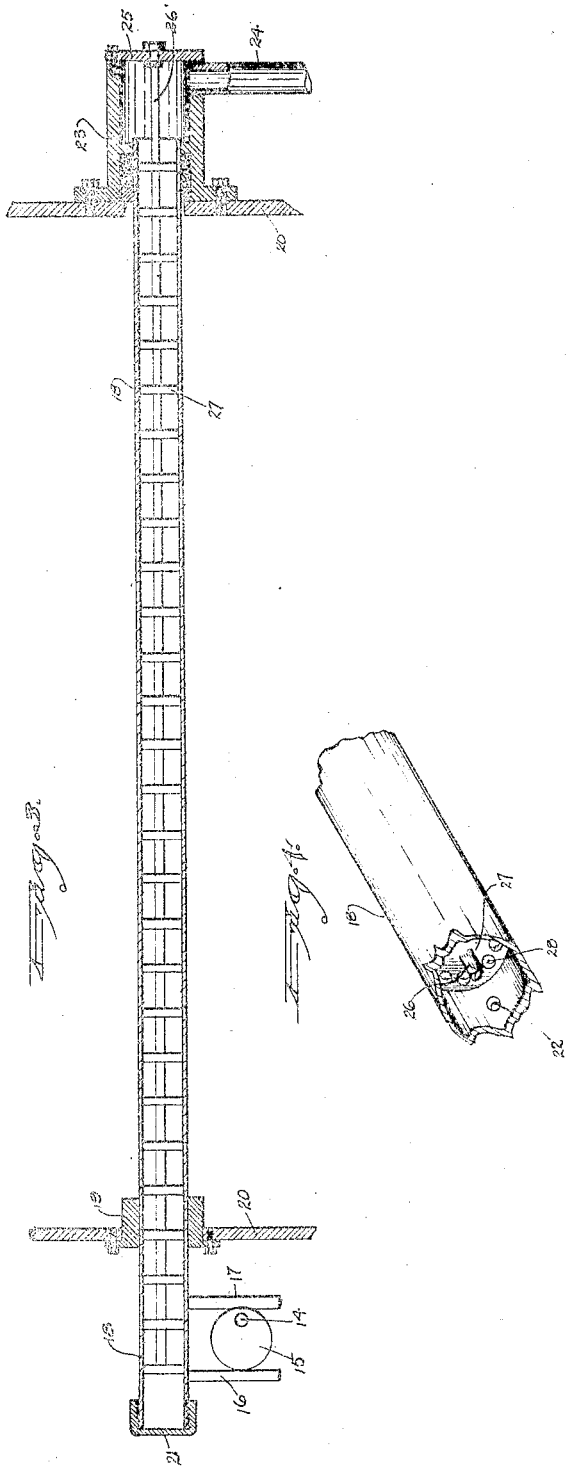

ROBERT W. STEVENS, OF NEW HAVEN, CONNECTICUT.

SHOWER-PIPE FOR PAPER-MAKING MACHINES.

1,352,485.  Specification of Letters Patent.  Patented Sept. 14, 1920.

Application filed November 10, 1919. Serial No. 336,802.

*To all whom it may concern:*

Be it known that I, ROBERT W. STEVENS, a citizen of the United States, residing at New Haven, in the county of New Haven and State of Connecticut, have invented a new and useful Improvement in Shower-Pipes for Paper-Making Machines; and I do hereby declare the following, when taken in connection with the accompanying drawings, and the characters of reference marked thereon, to be a full, clear, and exact description of the same, and which said drawings constitute part of this application, and represent, in—

Figure 1. A front view of a portion of a paper-making machine illustrating the location of my attachment with relation thereto.

Fig. 2. A side view partly in section of my improved shower pipe.

Fig. 3. A longitudinal section view of the pipe and adjacent parts detached.

Fig. 4. A broken perspective view of a portion of the pipe showing one of the swabs therein.

This invention relates to improvement in shower pipes for paper-making machines. In paper making, a number of the rolls, cylinder molds, felts, wire cloth, et cetera, must be kept clean and it is common to arrange a spray or shower in close relation thereto, but the pipes of such sprays or showers become clogged and it is difficult to keep them clear. Furthermore as usually arranged the spray pipes are stationary so that the water is distributed in rows. The object of this invention is to arrange a pipe in close relation to the roll or mold to be sprayed and provide for longitudinally moving the pipe and to arrange within the pipe a series of swabs which, as the pipe is moved, will clear the openings in the pipe so as to permit the water to be freely discharged and the invention consists in the construction as hereinafter described and particularly recited in the claims.

In carrying out my invention I have shown my device arranged in connection with a cylinder mold 10, of an ordinary paper machine, to the shaft 11 of which I mount a worm gear 12, meshing with a worm wheel 13 on a shaft 14, which is suitably supported and which carries an eccentric or cam 15. This cam 15 stands between two cam arms 16 and 17 depending or projecting outward from a shower pipe 18 which is arranged parallel to the shaft 11 of the cylinder mold and projects outward through a bushing 19 in the frame 20 of the machine. The outer end of the pipe is closed by a cap 21 and the pipe is formed with a series of perforations 22 and its rear end is supported in a stuffing box 23 at the rear of the machine. Into the stuffing box a liquid supply pipe 24 enters so as to be discharged into the shower pipe 18. Supported by a plate 25 or otherwise, is a rod 26 which extends forward through the shower pipe 18 and mounted on this rod are a series of swabs 27 which closely fit in the shower pipe 18 and each swab is formed with a number of perforations 28 through which the liquid may pass. The liquid to be used in the shower is admitted under pressure through the pipe 24, entering the stuffing box 23 and, passing through the shower pipe 18, is distributed through the perforations 22 upon the mold, roll or other part of the machine and as the machine is driven, the cam 15 moves the pipe 18 back and forth so that the openings 22 in the pipe pass the swabs and are cleared thereby. I thus provide simple and convenient means for keeping the shower pipes for paper-making machines free to discharge their functions and the spray is evenly distributed throughout the length of the roll or mat.

I claim:

1. In a shower pipe for paper-making machines, mounted for longitudinal movement and formed with a series of perforations combined with a stationary rod having a series of swabs mounted thereon and over which the shower pipe rides.

2. In a paper-making machine, a combination with a shower pipe, means for longitudinally moving the pipe, a stuffing box supporting the open end of the pipe, a fixed rod supported in line with and entering said pipe and a series of swabs mounted on said rod.

3. In a paper-making machine, the combination with a longitudinally movable shower pipe provided with cam arms, a cam between said arms and adapted to move the pipe back and forth, means for admitting liquid to the said pipe, a rod arranged longitudinal with and entering the said shower pipe, a series of swabs mounted on said rod, each of said swabs formed with perforations through which liquid may pass and means for moving the shower pipe back and forth.

In testimony whereof, I have signed this specification in the presence of two subscribing witnesses.

ROBERT W. STEVENS.

Witnesses:
  FREDERIC C. EARLE,
  J. HAROLD FLYNN.